United States Patent
Cole et al.

(10) Patent No.: US 7,184,437 B1
(45) Date of Patent: Feb. 27, 2007

(54) SCALABLE ROUTE RESOLUTION

(75) Inventors: Bruce A Cole, San Francisco, CA (US); James Murphy, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1034 days.

(21) Appl. No.: 10/197,922

(22) Filed: Jul. 17, 2002

(51) Int. Cl.
*H04L 12/28* (2006.01)

(52) U.S. Cl. ..................... 370/392; 370/400

(58) Field of Classification Search ............. None
See application file for complete search history.

(56) References Cited

U.S. PATENT DOCUMENTS

| | | | |
|---|---|---|---|
| 6,192,051 B1 * | 2/2001 | Lipman et al. | 370/389 |
| 6,463,061 B1 * | 10/2002 | Rekhter et al. | 370/392 |
| 6,549,519 B1 * | 4/2003 | Michels et al. | 370/238 |
| 6,553,002 B1 * | 4/2003 | Bremer et al. | 370/254 |
| 7,061,911 B2 * | 6/2006 | Furuno | 370/392 |
| 2001/0028651 A1 * | 10/2001 | Murase | 370/392 |
| 2003/0091043 A1 * | 5/2003 | Mehrotra et al. | 370/389 |
| 2003/0198234 A1 * | 10/2003 | Pin | 370/400 |

* cited by examiner

*Primary Examiner*—Chau Nguyen
*Assistant Examiner*—Jung Park
(74) *Attorney, Agent, or Firm*—Shumaker & Sieffert, P.A.

(57) ABSTRACT

A router comprises a route resolution module to maintain routing information in accordance with a topology of a network, and an indirect next hop manager to maintain indirect next hop data that associates protocol next hops with forwarding next hops. The route resolution module invokes an application programming interface (API) of the indirect next hop manager for associating and disassociating protocol next hops and forwarding next hops. In response to a network event, the route resolution module can modify the indirect next hop data to reduce the time and resources necessary to perform route resolution.

31 Claims, 6 Drawing Sheets

| INH INDEX | PNH | FNH |
|---|---|---|
| 1 | 4.0.0.1 | e0 |
| 2 | 5.0.0.1 | e1 |

| INH INDEX | PNH | EXPORT POLICY | LABEL | RIB | FNH |
|---|---|---|---|---|---|
| 1 | 4.0.0.1 | RULE 1 | - | 1 | e0 |
| 2 | 4.0.0.1 | RULE 2 | - | 1 | e0 |
| 3 | 5.0.0.1 | - | 1001 | 2 | e1 |

SCALABLE ROUTE RESOLUTION

TECHNICAL FIELD

The invention relates to computer networks and, more particularly, to techniques for routing packets within computer networks.

BACKGROUND

A computer network is a collection of interconnected computing devices that can exchange data and share resources. In a packet-based network, such as the Internet, the computing devices communicate data by dividing the data into small blocks called packets, which are individually route across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet and forwards the packet in accordance with the routing information.

In order to maintain an accurate representation of the network, routers periodically exchange routing information in accordance with a defined protocol, such as the Border Gateway Protocol (BGP). Large computer networks, such as the Internet, often include many routers grouped into administrative domains called "autonomous systems." When routers of different autonomous systems use BGP to exchange information, the protocol is referred to as External BGP (EBGP). When routers within an autonomous system use BGP to exchange routing information, the protocol is referred to as Internal BGP (IBGP). Another example protocol for exchanging routing information is the Intermediate System to Intermediate System protocol (ISIS), which is an interior gateway routing protocol for IP networks for communicating link-state information within an autonomous system. Other examples of interior routing protocols include the Open Shortest Path First (OSPF), and the Routing Information Protocol (RIP).

When two routers initially connect, they typically exchange all of their routing information. The routers send control messages to incrementally update the routing information when the network topology changes. For example, the routers may send update messages to advertise newly available routes, and to withdraw routes that are no longer available.

Conventional routers often maintain the routing information in the form of one or more routing tables or other data structures. The form and contents of the routing tables often depends on the routing algorithm implemented by the router. Furthermore, some conventional routers generate and maintain forwarding information in accordance with the routing information. The forwarding information associates network routes with specific forwarding next hops and corresponding interface ports of the router. The forwarding information may, therefore, be thought of as a subset of the information contained within routing information. The process of generating the forwarding information is generally referred to as route resolution.

Due to the size and complexity of the routing information maintained by routers within a large network, such as the Internet, a single change in network topology may require route resolution for tens of thousands, if not hundreds of thousands, of individual routes. For example, it is not uncommon for a single router at the edge of an autonomous system to represent the egress for thousands of routes originating within the system. Accordingly, a single network event, such as the failure of the edge router or a link coupled to the edge router, can force routers within the system to perform route resolution for hundreds of thousands of routes, which can consume considerable computing resources and substantially delay rerouting of packets.

SUMMARY

In general, the invention provides for increased efficiency in performing route resolution, as is often required in the event of a change in network topology. According to the principles of the invention, a router maintains indirect next hop data that maps protocol next hops to forwarding next hops. The mapping may be implemented as a numerical space in which each unique value represents a unique combination of a "protocol next hop" (PNH) and a "forwarding next hop" (FNH). An index into the indirect next hop data may identify a unique (PNH, FNH) pair, in which the PNH represents a key associated with a unique FNH value. Other protocol-level information can be incorporated within the key, such as export policy, Quality-of-Service (QoS) class, VPN label, MPLS label, and the like.

In one embodiment, the invention is directed to a method comprising routing packets within a network using indirect next hop data that associates protocol next hops with forwarding next hops. The method may include receiving a packet comprising network update information, and modifying the indirect next hop data in response to the network update information to associate at least one of the protocol next hops with a different forwarding next hop.

The indirect next hop data may comprise addressable entries that store forwarding next hops and associated protocol next hops. In addition, the entries may store forwarding next hops associated with protocol next hops in combination with other routing information, such as routing labels, Quality of Service requirements, packet forwarding policies, and the like.

In another embodiment, the invention is directed to a router comprising a computer-readable medium to store indirect next hop data having addressable elements, wherein the elements uniquely associate protocol next hops with forwarding next hops.

In another embodiment, the invention is directed to a computer-readable medium comprising indirect next hop data having addressable elements, wherein the elements uniquely associated protocol next hops with forwarding next hops.

In another embodiment, the invention is directed to a router comprising a route resolution module to maintain routing information in accordance with a topology of a network; and an indirect next hop manager to maintain indirect next hop data that associates protocol next hops with forwarding next hops. The route resolution module invokes an application programming interface (API) of the indirect next hop manager for associating and disassociating protocol next hops and forwarding next hops.

The invention may offer advantages, including reducing the impact and latency of network topology changes by reducing the computer resources required to perform route resolution. For example, the routing engine may issue a single message directing the forwarding engine to update a (key, value) pair, i.e., to associate a protocol next hop and any additional protocol-level routing information with a different forwarding next hop. In this manner, the routing engine may issue a limited number of messages to update forwarding information in response to a network event that affects thousands of routes having the same protocol next hop.

Accordingly, processing requirements of the routing engine can be limited to the affected routes. Furthermore, the number of messages between the routing engine and the packet-forwarding engine need not be a direct function of the number of routes affected by the change, as with conventional routers. Consequently, the techniques may greatly reduce the amount of information exchanged between the routing engine and the packet-forwarding engine. In addition, the routing engine can perform route resolution to revise the resolution state of any dependent resolution nodes during background processing, and after directing the packet forwarding engine to update forwarding information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
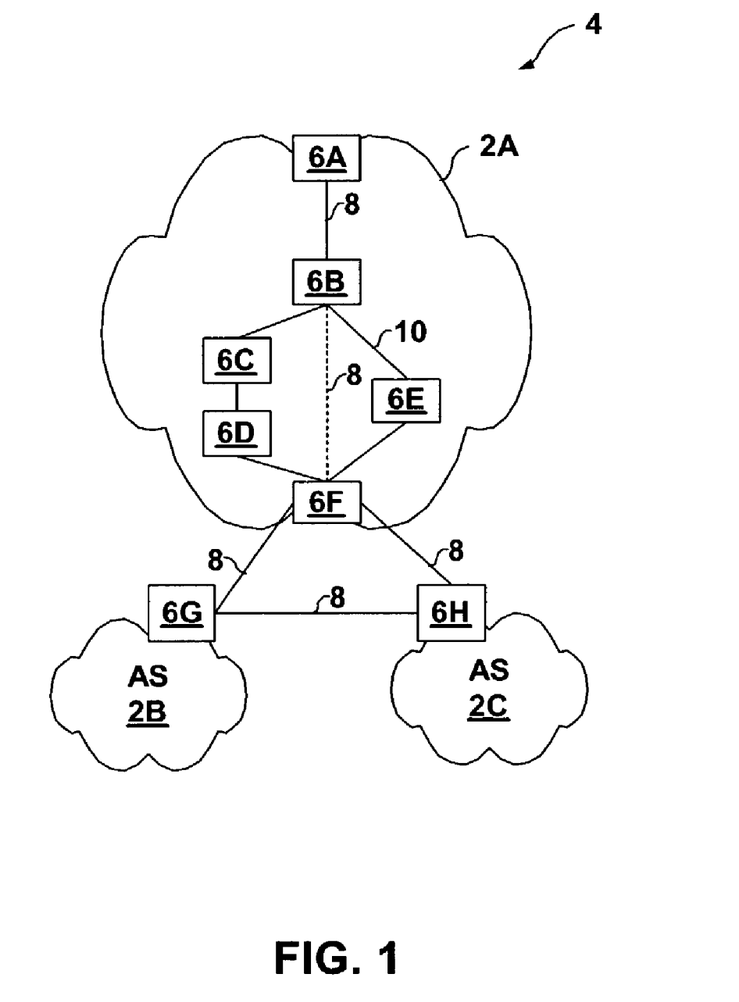
FIG. 1 is a block diagram illustrating a group of autonomous systems that forms a computing network.

FIG. 1 is a block diagram illustrating a group of autonomous systems 2A–2C (collectively 2) that form a computing network 4. Each autonomous system 2 includes at least one router, illustrated in FIG. 1 as routers 6A–6H, for forwarding network packets. Routers 6A–6H are interconnected by a number of physical communication links, represented by solid lines in FIG. 1. Routers 6A, 6B, 6F–6H use an exterior routing protocol, such as BGP, to exchange route information for autonomous systems 2. In this sense, routers 6A, 6B, 6F–6H can be considered peers with respect to routes associated with the BGP protocol. Routers 6A–6F may use an interior routing protocol, such as internal BGP (IBGP), or IS-IS, OSPF, or RIP to exchange routing information within autonomous system 2A.

As an edge router to autonomous system 2A, router 6F may have a large number of routes originating within autonomous system 2A. The routes may be associated with router 6F for forwarding packets to autonomous systems 2B, 2C. In the event of a network event, such as failure of link 10, router 6B recomputes the FNH for BGP routing information learned via router 6F. As a result, router 6B performs route resolution by invoking a path selection algorithm for each known destination affected by the link failure until new paths for each known destination is selected. Accordingly, a single network event can force a router, such as router 6B, to perform route resolution for hundreds of thousands of routes. For example, failure of link 10 can cause router 6B to perform route resolution for those routes whose preferred path had been via router 6E, and now must reach router 6F via some other path. This computation can consume considerable computing resources and substantially delay rerouting of packets.

In order to reduce the time and resources necessary to perform route resolution, router 6 employ techniques that introduce an abstracted level of association that maps protocol-level routing information to forwarding information. The mapping may be implemented as a numerical space in which each unique value is associated with a combination of a protocol-level routing information and respective forwarding information in the form of a (key, value) pair.

In one embodiment, for example, each unique index value of the numerical space, referred to herein as indirect next hop data, represents a unique combination of a "protocol next hop" (PNH) and a "forwarding next hop" (FNH). A PNH, as used herein, generally refers to the next hop along a route as disseminated in accordance with a routing protocol, such as BGP. For example, BGP-enabled router 6F may be considered the PNH for another BGP-enabled router, even though the BGP-enabled routers may be connected by one or more non-BGP enabled routers. The PNH typically specifies an Internet Protocol (IP) address of the router. Accordingly, router 6B may associate router 6F as the PNH for routes originating from router 6F. Conversely, an FNH from the source router along a given route typically refers to a neighboring router physically coupled to the source router along that route. For example, the FNH for a route may specify a physical interface and media access control (MAC) address for the interface associated with the router.

In this manner, each index into the indirect next hop data may identify a unique (PNH, FNH) pair, in which the PNH represents the key associated with a unique FNH value. Other protocol-level information can be incorporated within the key, such as export policy, Quality-of-Service (QoS) class, VPN label, MPLS label, and the like. As described in detail below, routers 6 make use of the indirect next hop data to reduce the computational requirements needed to perform route resolution in response to a network event.

Figure 2:
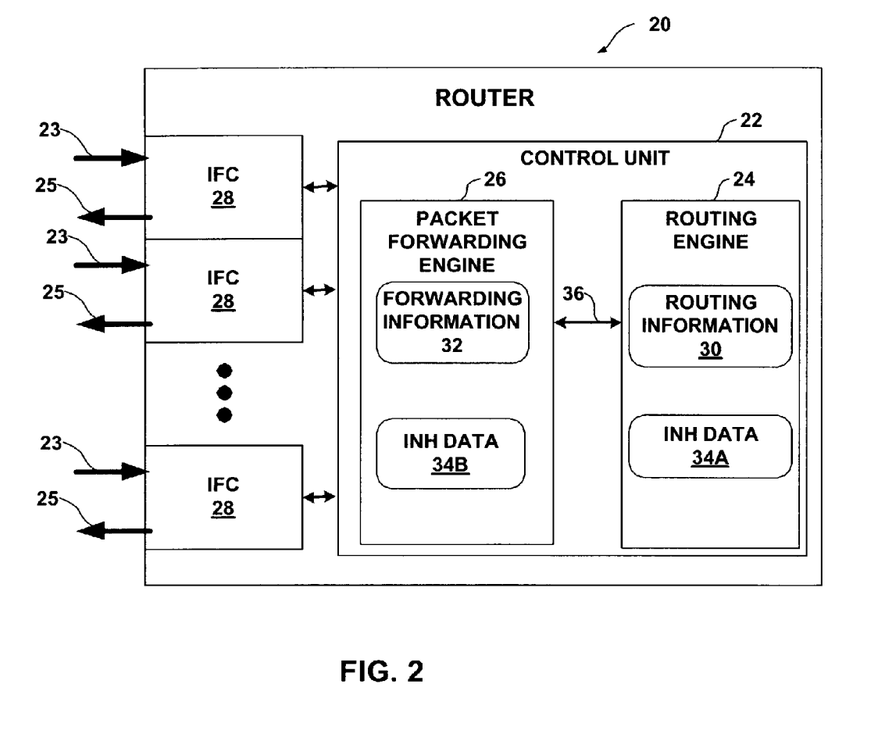
FIG. 2 is a block diagram illustrating an example embodiment of a router consistent with the principles of the invention.

FIG. 2 is a block diagram illustrating an example embodiment of a router 20 consistent with the principles of the invention. Router 20 includes a control unit 22 that directs inbound packets received from inbound link 23 to the appropriate outbound link 25. In particular, the functionality of control unit 22 can be divided between a routing engine 24 and a packet-forwarding engine 26.

Routing engine 24 is primarily responsive for maintaining routing information 30 to reflect the current network topology. In accordance with routing information 30, packet-forwarding engine 85 maintains forwarding information 32 that associates destination information, such as IP address prefixes, with specific FNHs and corresponding interface ports of interface cards (IFCs) 28. Forwarding information 32 may, therefore, be thought of as a subset of the information contained within routing information 30.

Upon receiving an inbound packet, packet-forwarding engine 26 directs the inbound packet to an appropriate IFC 28 for transmission based on forwarding information 32. In one embodiment, each of packet-forwarding engine 26 and routing engine 24 may comprise one or more dedicated processors, hardware, and the like, and may be communicatively coupled by data communication channel 36. Data communication channel 36 may be a high-speed network connection, bus, shared-memory or other data communication mechanism.

Routing engine 24 generates and maintains the indirect next hop (INH) data 34 in accordance with routing information 30. As described above, INH data 34A may comprise a mapping between protocol-level routing information and respective forwarding information in the form of a (key, value) pair. In one embodiment, for example, routing engine 24 represents INH data 34A as unique associations of PNHs and FNHs. Accordingly, routing engine 24 may maintain a set of valid indexes into indirect next hop data 34A, each of which identify a unique (PNH, FNH) pair. Other protocol-level information can be incorporated within the key, such as export policy, Quality-of-Service (QoS) class, VPN label, MPLS label, and the like. Routing engine 24 communicates INH data 34A to forwarding engine 26, which stores the data as INH data 34B. Forwarding engine 26 forwards packets in accordance with forwarding information 32 and INH data 34B, which may be a replica of INH data 34A.

Routing engine 24 may maintain routing information 30 to include a number of route entries within one or more data sources, and one or more radix trees having route resolution nodes. Routing engine 24 may maintain resolution nodes for routes having FNHs, and for routes having INHs. The resolution nodes may be threaded together using pointers or linked lists to represent the FNH dependencies between routes. Routing engine 24 performs route resolution by traversing the radix tree according to the PNH associated with the route.

In response to topology changes, routing engine 24 analyzes the dependencies within the routing information to determine FNHs for the affected routes. Based on the determination, routing engines 24 issues one or more messages directing forwarding engine 26 to update the indirect next hop data 34B. For example, routing engine 24 may issue a single message directing the forwarding engine to update a (key, value) pair, i.e., to associate a PNH and any additional protocol-level routing information with a different FNH. In this manner, routing engine 24 may issue a single message to update forwarding information 32 in response to a network event that affects thousands of routes having the same PNH.

Upon issuing the messages, routing engine 24 proceeds to perform route resolution and regenerate routing information 30 as necessary based on the dependencies between the routes. Accordingly, processing requirements of the centralized routing engine 24 can be limited to the affected routes. Furthermore, the number of messages is no longer a function of the number of routes affected by the change, as with conventional routers. Accordingly, the techniques may greatly reduce the amount of information exchanged between routing engine 24 and packet-forwarding engine 26. In addition, routing engine 24 can perform route resolution to revise the resolution state of any dependent resolution nodes during background processing during periods of time in which a processor of the routing engine may otherwise be idle, and after directing forwarding engine 26 to update forwarding information 32.

The architecture of router 20 illustrated in FIG. 2 is for exemplary purposes only. The invention is not limited to this architecture. In other embodiments, router 20 may be configured in a variety of ways. In one embodiment, for example, forwarding engine 26, routing engine 24, or both, may be replicated and incorporated directly within IFCs 28.

Figure 3:
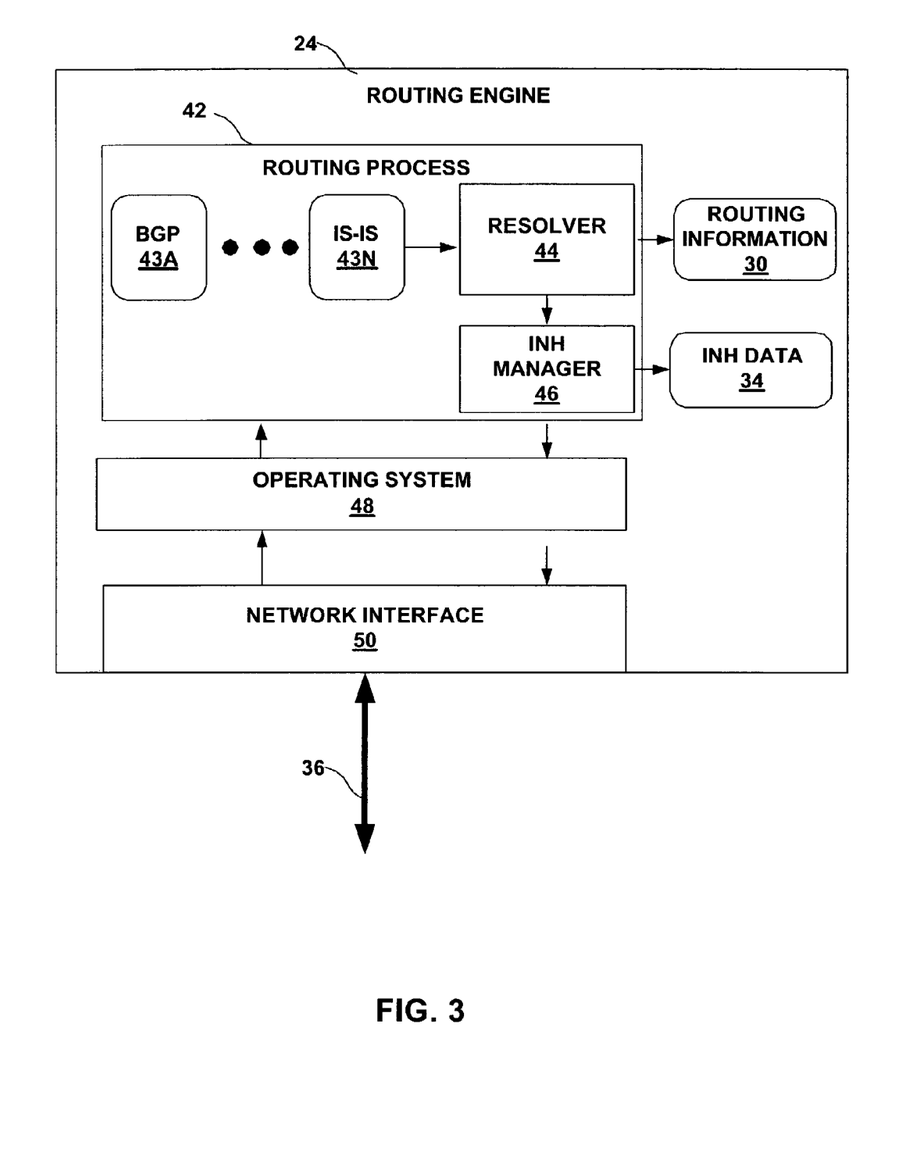
FIG. 3 is a block diagram illustrating an example routing engine consistent with the principles of the invention.

FIG. 3 is a block diagram illustrating an example routing engine 24 consistent with the principles of the invention. Routing engine 24 may comprise an operating system 48 executing on a programmable processor (not shown). Operating system 48 provides a multi-tasking operating environment for execution of a number of processes including a routing protocols (RP) process 42 that implements the various protocols supported by routing engine 24. Other processes (not shown) may include a device configuration process that controls the physical configuration of router 20, and a user interface (UI) process that provides an interface by which a remote system administrator or script can control and configure router 20. An example of such an operating system is FreeBSD, which is an advanced UNIX operating system that is compatible with a number of programmable processors, including processors from Intel Corporation™.

Routing engine 24 includes network interface 50 that provides a hardware interface for receiving and transmitting packets. Network interface 50 may be, for example, a network interface coupled to forwarding engine 26 via an internal data communication channel 36. Upon receiving a packet, network interface 50 typically generates a hardware interrupt, causing operating system 48 to invoke interrupt service routine to retrieve the inbound packet for processing.

RP process 42 includes one or more threads 43A–43N that implement the various protocols supported by routing engine 24. RP process 28A may include, for example, threads that implement protocols for exchanging route information with other routing devices, such as BPG and IS-IS. RP process 42 further includes a route resolution module 44 and indirect next hop (INH) manager 46.

Route resolution module 44 performs route resolution based on information received from the network protocol threads 43, and updates routing information 30 based on the resolution. In addition, route resolution module 44 invokes INH manager 46 for generating and maintaining INH data 34. In particular, INH manager 46 presents an application programming interface (API) for associating and disassociating protocol-level routing information, such as a PNH, and respective forwarding information, such as FNH, in the form of a (key, value) pair. In addition, route resolution module 44 maintains dependency data to track FNH dependencies between routes. Although illustrated as separate modules, the functionality of route resolution module 44 and INH manager 46 may be incorporated into a single module.

To further illustrate the techniques, assume router 6B (FIG. 1) receives a BGP message advertising a BGP route in which an Internet Protocol prefix 3/8 is associated with a PNH 4.0.0.1 of peer BGP router 6F. In addition, assume router 6B receives an IS-IS message associating a prefix 4/8 with an FNH of e0 to neighboring router 6E. In response to the messages, route resolution module 44 (FIG. 3) determines that PNH 4.0.0.1 satisfies IP prefix 4/8, and invokes INH manager 46 to establish an indirect next hop associating the PNH of 4.0.0.1 with the FNH of e0. INH manager 46 updates INH data 34 by allocating a numerical INH index, e.g., incrementing the INH index from 0 to 1 and associating the INH index with a new entry (4.0.0.1, e0) within INH data 34A.

Similarly, assume router 6B receives a number of additional BGP messages from router 6F advertising routes having IP prefixes that satisfy the IP prefix 3/8 of the first example route, such as prefixes of 3.0.1.7/16, 3.204.0.1/16, 3.204.0.10/24, and 3.204.0.8/24. Because these routes have the same (PNH, FNH) pair, i.e., (4.0.0.1, e0), route resolution module 44 associates these routes with the same INH index as the first example route. In this sense, these routes overlap with the more general route in which prefix 3/8 is associated with a PNH 4.0.0.1.

Figure 4A:
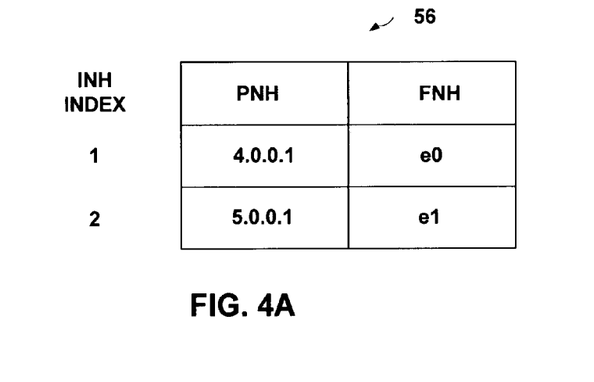
FIG. 4A is a block diagram illustrating an exemplary embodiment of a data structure for storing indirect next hop data.

FIG. 4A is a block diagram illustrating an exemplary data structure 56 for storing INH data. In the illustrated embodiment, data structure 58 forms a two-dimensional array having rows and columns. Each row can be accessed by a unique INH index, and uniquely associates a (key, value) pair, such as a (PNH, FNH) pair. INH index 1 indexes into row one of data structure 58 that associates PNH of 4.0.0.1 with FNH e0. Similarly, row two associates PNH of 5.0.0.1 with FNH e1. In this embodiment, the INH data maintains a one-to-one correspondence between PNHs and FNHs.

Figure 4B:
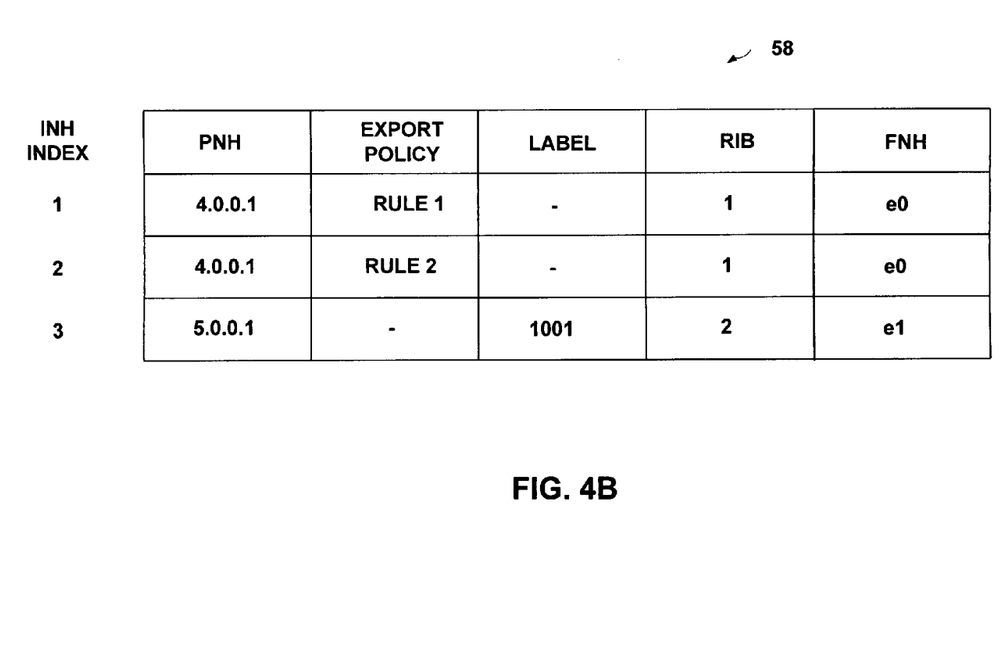
FIG. 4B is a block diagram illustrating another exemplary embodiment of a data structure for storing indirect next hop data.

FIG. 4B is a block diagram illustrating another exemplary data structure 58 for storing INH data. As in FIG. 4A, each row can be accessed by a unique INH index, and uniquely associates a (key, value) pair. In the illustrated embodiment, however, the key comprises a PNH in combination with additional routing information. For example, the PNH may be combined with one or more identifiers for forwarding policies maintained within routing information 30.

In addition, the PNH may be combined with a label that represents a packet flow, such as a VPN label, MPLS label, combinations thereof, or the like. The PNH may be further combined with a routing information base (RIB) identifier that indicates which one of a plurality of routing information data sources with which the particular PNH is associated. Routing engine 24 may, for example, comprise a plurality of databases storing routing information 30 for different protocols, sets of routes, sub-networks, and the like. Other protocol-level information can be incorporated within the key, such as a Quality-of-Service (QoS) class and the like. In this manner, routing engine 24 can maintain a finer level of control over the INH data 34, and can selectively update INH data 34 to more precisely and efficiently reroute packet flow.

Figure 5:
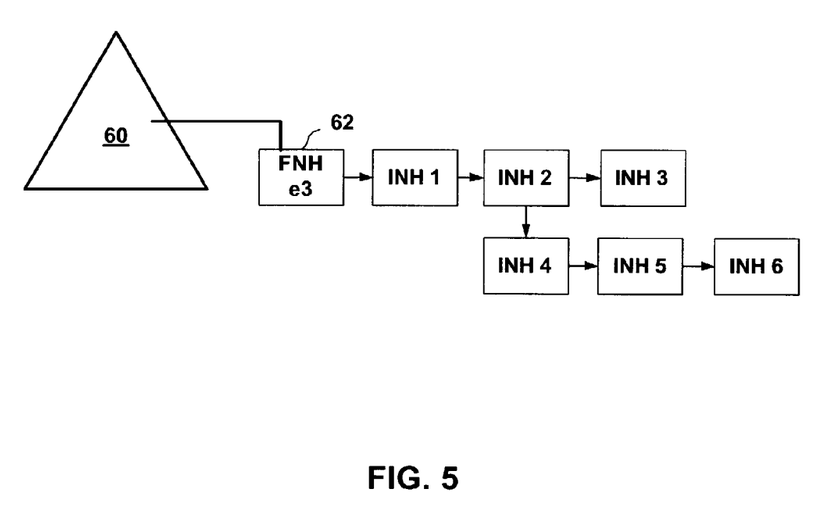
FIG. 5 is a block diagram illustrating an exemplary embodiment of data structures in which indirect next hops are linked in dependent form off a radix tree having route resolution leaf nodes.

FIG. 5 is a block diagram illustrating exemplary data structures in which routing information 30 is arranged as a radix tree 60 having route resolution leaf nodes, such as leaf node 62 that resolves routes to a FNH e3. In addition, a number of indirect next hops (INH 1–INH 6) are linked in dependent form off leaf node 62. The arrangement of routing information 30, or a portion thereof, as one or more radix trees is illustrated for exemplary purposes. The principles of invention may readily be applied to other arrangements. Routing information 30 may be arranged, for example, as a number of tables, link lists, and other data structures.

Upon receiving an update message that advertises or withdraws routes, e.g., in response to a network event, routing engine 24 reads a block of data, referred to as a key, from the message that describes the affected route or routes. The key may, for example, specify a routing prefix. Routing engine 8 resolves the key to one of the leaf nodes, e.g., leaf node 62, by sequentially testing bits within the key, e.g., bits A, B and C, that represent any bits within the block of data. Based on the value of each bit, routing engine 24 follows the links of data structure 60 through the various levels until reaching one of the leaf nodes to identify a FNH associated with the key.

Upon identifying a respective leaf node, routing engine 24 traverses any dependency links to determine whether any INHs are dependent upon the affected FNH. In the illustrated example, indirect next hops INH 1, INH 2 and INH 3 depend of FNH e3. In addition, indirect next hops INH 4, INH 5, and INH 6 recursively depend on INH 2.

Based on the determination, route resolution module 44 issues one or more messages directing INH manager 46 and forwarding engine 26 to update the INH data 34A, 34B, respectively. In the above example, route resolution module 44 may issue messages associating INH 1–INH 6 with a new FNH. In other words, route resolution module 44 may invoke the API presented by INH manager 46 to change the (key, value) pairs associated with INH 1–INH 6. In this manner, RP process 42 can resolve a plurality of routes, even tens of thousands of routes, to a different FNH by modifying a limited number of indirect next hops.

Figure 6:
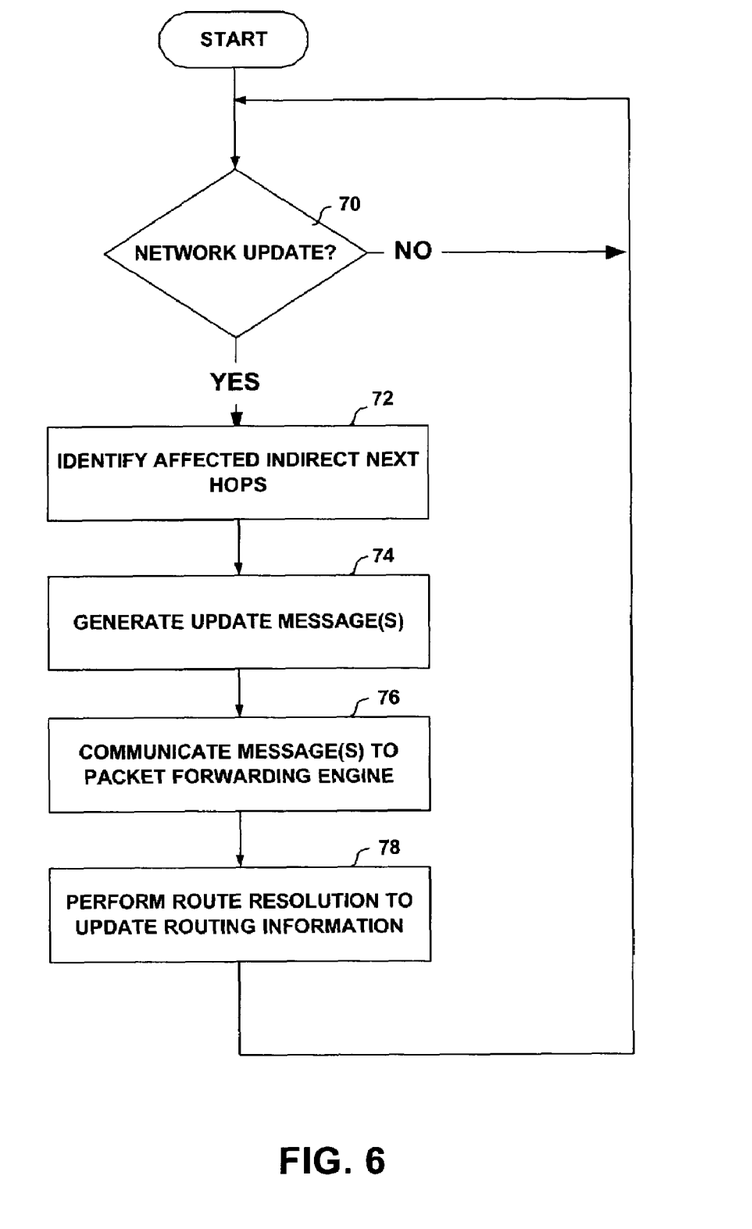
FIG. 6 is a flow chart illustrating an example operation of a router consistent with the principles of the invention.

FIG. 6 is a flow chart illustrating an example operation of routing engine 24 consistent with the principles of the invention. Upon receiving new network information from another network node (70), routing engine 24 examines routing information 30 to identify any affected INHs (72). Routing engine 24 may, for example, traverse a radix tree and identify one or more leaf nodes, as described above.

Based on the determination, routing engine 24 may generate one or more update messages directing INH manager 46 and packet-forwarding engine 26 to appropriately update next hop data 34A, 34B, respectively (74). Routing engine 24 communicates the messages to packet-forwarding engine 26 to update next hop data 34A. As described above, packet-forwarding engine 26 may dynamically reroute packets by modifying an entry within the INH numerical space, thereby modifying an association between a PNH and a FNH. Alternatively, packet-forwarding engine 26 may make use of the information to regenerate forwarding information 32, which may also be in the form of a tree-like data structure.

Finally, routing engine 24 performs route resolution to update routing information 30 (78). In particular, routing engine 24 may revise the resolution state of any dependent resolution nodes during background processing cycles, and after directing forwarding engine 26 to update forwarding information 32.

Various embodiments of the invention have been described. These and other embodiments are within the scope of the following claims.

The invention claimed is:

1. A method comprising:
   maintaining indirect next hop data within a centralized routing engine, wherein the indirect next hop data associates protocol next hops with forwarding next hops;
   communicating the indirect next hop data from the routing engine to one or more packet forwarding engines;
   updating the indirect next hop data within the centralized routing engine in response to network events;
   issuing one or more messages from the routing engine to at least one of the packet forwarding engines in response to the update, wherein the messages direct the packet forwarding engine to associate at least one of the protocol next hops with a different forwarding next hop; and
   routing packets within a network using the indirect next hop data.

2. The method of claim 1, wherein routing packets comprises:
  generating the indirect next hop data in response to protocol messages advertising routes within the network;
  generating forwarding information in accordance with the indirect next hop data; and
  forwarding the packets in accordance with the forwarding information.

3. The method of claim 1, wherein the indirect next hop data comprises addressable entries that store pairs of protocol next hops and forwarding next hops.

4. The method of claim 1, wherein updating the indirect next hop data comprises: receiving a packet comprising network update information.

5. The method of claim 1, wherein routing packets comprises:
  receiving a network message advertising one or more routes associated with a first protocol next hop;
  receiving a network message advertising one or more routes associated with a first forwarding next hop;
  resolving the first protocol next hop to the first forwarding next hop; and
  associating the first protocol next hop and the first forwarding next hop within the indirect next hop data.

6. The method of claim 5, wherein associating the first protocol next hop and the first forwarding next hop comprises:
  allocating an indirect next hop index; and
  storing the first protocol next hop and the first forwarding next hop within the indirect next hop data according to the indirect next hop index.

7. A method comprising:
  maintaining a tree data structure having route resolution leaf nodes that resolve prefixes to unique identifiers for addressable entries within indirect next hops data that associates protocol next hops and forwarding next hops;
  receiving a packet comprising network update information;
  traversing dependent route resolution leaf nodes of the tree in response to the network event to identify unique identifiers for one or more affected indirect next hops;
  modifying the addressable entries of the indirect next hop data addressed by the unique identifiers to associate at least one of the protocol next hops with a different forwarding next hop; and
  routing packets within a network using the indirect next hop data.

8. The method of claim 1, further comprising storing in the indirect next hop data forwarding next hops and associated protocol next hops in combination with identifiers for packet forwarding policies.

9. The method of claim 1, further comprising storing in the indirect next hop data forwarding next hops and associated protocol next hops in combination with forwarding labels.

10. The method of claim 9, wherein the forwarding labels comprise virtual private network labels.

11. The method of claim 9, wherein the forwarding labels comprise MPLS labels.

12. The method of claim 1, wherein the indirect next hop data includes addressable elements.

13. The method of claim 12, wherein each element represents a pair of a key and a value, and wherein the protocol next hops represent keys for the addressable elements and the forwarding next hops represent values for the elements.

14. The method of claim 12, wherein the indirect next hop data forms a two-dimensional array having rows and columns, and wherein each row is accessible by a respective indirect next hop index and uniquely associates a protocol next hop and a forwarding next hop.

15. The method of claim 12, wherein the elements uniquely associate forwarding next hops with protocol next hops in combination with identifiers for forwarding policies.

16. The method of claim 12, wherein the elements uniquely associate forwarding next hops with protocol next hops in combination with forwarding labels.

17. The method of claim 16, wherein the forwarding labels comprise virtual private network (VPN) labels.

18. The method of claim 16, wherein the forwarding labels comprise MPLS labels.

19. The method of claim 12, wherein the indirect next hop data comprises a numerical space in which the elements are addressable by an index.

20. A router comprising:
  a computer-readable medium to store indirect next hop data having addressable elements, wherein the elements uniquely associate protocol next hops with forwarding next hops;
  a routing engine to maintain routing information in accordance with a topology of a network; and
  a packet forwarding engine to forward packets in accordance with forwarding information, wherein, in response to network events, the routing engine updates the indirect next hop data and issues messages directing the packet forwarding engine to update the forwarding information,
  wherein the packet forwarding engine maintains a version of the indirect next hop data and updates the version of the indirect next hop data in response to the messages by modifying the indirect next hop data to associate at least one protocol next hop with a different forwarding next hop.

21. The router of claim 20, wherein each element represents a pair of a key and a value, and wherein the protocol next hops represent keys for the addressable elements and the forwarding next hops represent values for the elements.

22. The router of claim 20, wherein the indirect next hop data forms a two-dimensional array having rows and columns, and wherein each row is accessible by a respective indirect next hop index and uniquely associates a protocol next hop and a forwarding next hop.

23. The router of claim 20, wherein the elements uniquely associate forwarding next hops with protocol next hops in combination with identifiers for forwarding policies.

24. The router of claim 20, wherein the elements uniquely associate forwarding next hops with protocol next hops in combination with forwarding labels.

25. The router of claim 24, wherein the forwarding labels comprise virtual private network (VPN) labels.

26. The router of claim 24, wherein the forwarding labels comprise MPLS labels.

27. The router of claim 20, wherein the indirect next hop comprises a numerical space in which the elements are addressable by an index.

28. A router comprising:
  a routing engine comprising:
    (i) a route resolution module to maintain routing information in accordance with a topology of a network; and (ii) an indirect next hop manager to maintain indirect next hop data that associate protocol next hops with forwarding next hops, wherein the route resolution module invokes an application programming interface (API) of the indirect next hop manager for associating and disassociating protocol next hops and forwarding next hops; and a packet forwarding engine to forward packets in accordance with forwarding information, wherein, in response to network events, the routing engine updates the indirect next hop data and issues messages directing the packet forwarding engine to update the forwarding information, wherein the packet forwarding engine maintains a version of the indirect next hop data and updates the version of the indirect next hop data in response to the messages by modifying the indirect next hop data to associate at least one protocol next hop with a different forwarding next hop.

29. The router of claim 28, wherein the route resolution module maintains a tree having route resolution leaf nodes that resolve prefixes to indirect next hops.

30. The router of claim 29, wherein the route resolution module traverses dependent route resolution leaf nodes of the tree in response to the network event and identifies one or more affected indirect next hops.

31. The router of claim 28, wherein the indirect next hop data comprises addressable elements, wherein each element stores a protocol next hop and a respective forwarding next hop.

* * * * *